United States Patent
Yoshioka et al.

(10) Patent No.: US 10,651,465 B2
(45) Date of Patent: May 12, 2020

(54) NEGATIVE ELECTRODE ACTIVE MATERIAL FOR ELECTRICAL DEVICE, AND ELECTRICAL DEVICE INCLUDING THE SAME

(71) Applicant: Nissan Motor Co., Ltd., Yokohama-shi, Kanagawa (JP)

(72) Inventors: Youichi Yoshioka, Kanagawa (JP); Nobutaka Chiba, Kanagawa (JP); Manabu Watanabe, Kanagawa (JP); Masaya Arai, Kanagawa (JP)

(73) Assignee: Nissan Motor Co., Ltd., Yokohama-shi, Kanagawa (JP)

( * ) Notice: Subject to any disclaimer, the term of this patent is extended or adjusted under 35 U.S.C. 154(b) by 0 days.

(21) Appl. No.: 16/309,416

(22) PCT Filed: Jun. 16, 2016

(86) PCT No.: PCT/JP2016/068016
§ 371 (c)(1),
(2) Date: Dec. 12, 2018

(87) PCT Pub. No.: WO2017/216939
PCT Pub. Date: Dec. 21, 2017

(65) Prior Publication Data
US 2019/0312270 A1    Oct. 10, 2019

(51) Int. Cl.
*H01M 4/38*    (2006.01)
*C22C 29/18*    (2006.01)
(Continued)

(52) U.S. Cl.
CPC ............ *H01M 4/386* (2013.01); *C22C 28/00* (2013.01); *C22C 29/18* (2013.01); *H01M 4/38* (2013.01);
(Continued)

(58) Field of Classification Search
CPC ................ H01M 4/386; H01M 4/387; H01M 2004/027; C22C 29/18
See application file for complete search history.

(56) References Cited

U.S. PATENT DOCUMENTS

2006/0040182 A1    2/2006    Kawakami et al.
2007/0148544 A1*    6/2007    Le ........................ B22F 9/002
429/218.1
(Continued)

FOREIGN PATENT DOCUMENTS

CN    102007627 A    4/2011
EP    3010075 A1    4/2016
(Continued)

*Primary Examiner* — Jonathan G Jelsma
(74) *Attorney, Agent, or Firm* — Young Basile Hanlon & MacFarlane, P.C.

(57) ABSTRACT

A negative electrode active material including a silicon-containing alloy having a ternary alloy composition expressed by Si—Sn—Ti and including a structure in which an a-Si phase containing amorphous or low-crystalline silicon formed by dissolving tin in a crystal structure of silicon is dispersed in a parent phase of a silicide phase including $TiSi_2$, wherein when a peak intensity of a Si—O bond peak that is observed at a position where an interatomic distance in a radial wave function observed by XAFS is 0.13 nm is S(1) and a peak intensity of a Si—Si bond peak that is observed at a position where the interatomic distance is 0.2 nm is S(2), a relation of S(2)>S(1) is satisfied is used for an electrical device. When used, the negative electrode active material achieves both cycle durability and charging-discharging efficiency for an electrical device such as a lithium ion secondary battery.

6 Claims, 2 Drawing Sheets

(51) Int. Cl.
*H01M 10/0525* (2010.01)
*C22C 28/00* (2006.01)
*H01M 4/02* (2006.01)

(52) U.S. Cl.
CPC ....... *H01M 4/387* (2013.01); *H01M 10/0525* (2013.01); *C01P 2002/80* (2013.01); *H01M 2004/027* (2013.01)

(56) References Cited

U.S. PATENT DOCUMENTS

| | | |
|---|---|---|
| 2008/0113271 A1 | 5/2008 | Ueda et al. |
| 2009/0053589 A1 | 2/2009 | Obrovac et al. |
| 2011/0031935 A1 | 2/2011 | Miyoshi et al. |
| 2014/0353546 A1 | 12/2014 | Watanabe et al. |
| 2017/0005362 A1 | 1/2017 | Nakagawa et al. |

FOREIGN PATENT DOCUMENTS

| | | |
|---|---|---|
| JP | 2001256974 A | 9/2001 |
| JP | 2010135336 A | 6/2010 |
| JP | 2013134905 A | 7/2013 |
| WO | 2006129415 A1 | 12/2006 |
| WO | 2015111190 A1 | 7/2015 |

\* cited by examiner

NEGATIVE ELECTRODE ACTIVE MATERIAL FOR ELECTRICAL DEVICE, AND ELECTRICAL DEVICE INCLUDING THE SAME

TECHNICAL FIELD

The present invention relates to a negative electrode active material for an electrical device, and an electrical device including the same. The negative electrode active material for an electrical device and the electrical device including the same according to the present invention are used as a secondary battery, a capacitor, or the like of, for example, a driving power source or an auxiliary power source of a motor or the like in a vehicle such as an electric vehicle, a fuel cell vehicle, or a hybrid electric vehicle.

BACKGROUND

In recent years, reduction of carbon dioxide has been strongly demanded in order to deal with air pollution and global warming. In the automobile industry, the reduction of carbon dioxide emission due to the introduction of electric vehicles (EVs) or hybrid vehicles (HEVs) has been expected, and electrical devices such as a secondary battery for motor driving, which is a key to achieving the practical application of these vehicles, have been developed extensively.

The secondary battery for the motor driving has been required to have an extremely high output characteristic and high energy as compared to a lithium ion secondary battery for consumer use that is used for a mobile phone, a laptop computer, or the like. Therefore, the lithium ion secondary battery with the highest theoretical energy among all the batteries has attracted attention, and the development thereof has been advanced rapidly.

The lithium ion secondary battery generally has a structure in which a positive electrode formed by applying a positive electrode active material or the like on both surfaces of a positive electrode current collector using a binder and a negative electrode formed by applying a negative electrode active material or the like on both surfaces of a negative electrode current collector using a binder are connected to each other through an electrolyte layer, and housed in a battery case.

Conventionally, a carbon/graphite-based material has been used for the negative electrode of the lithium ion secondary battery because such a material is advantageous in cost and lifetime of the charging-discharging cycle. However, in the case of using the carbon/graphite-based negative electrode material, charging and discharging are performed by intercalating and deintercalating lithium ions in and out of graphite crystals; thus, a charging-discharging capacity of more than or equal to the theoretical capacity, 372 mAh/g, that is obtained from $LiC_6$ corresponding to the maximum lithium introduction compound cannot be achieved. This is disadvantageous. In view of this, it has been difficult to achieve the capacity and the energy density that satisfy the practical application level of the carbon/graphite-based negative electrode material for the use in the vehicle.

On the other hand, the battery including a material that is alloyed with Li in the negative electrode, which has higher energy density than that of the conventional carbon/graphite-based negative electrode material, has been anticipated as the negative electrode material for the use in the vehicle. For example, a Si material intercalates and deintercalates 3.75 mol of lithium ions per mole of the Si material in charging and discharging as expressed in the following Reaction Formula (A), and the theoretical capacity is 3600 mAh/g in $Li_{15}Si_4$ (=$Li_{3.75}Si$).

$$Si+3.75Li^{+}+e^{-} \leftrightarrows Li_{3.75}Si \qquad (A)$$

However, in the lithium ion secondary battery including the material that is alloyed with Li in the negative electrode, the negative electrode expands and contracts largely in charging and discharging. For example, when Li ions are intercalated, the negative electrode expands in volume by about 1.2 times in the case of the graphite material; on the other hand, in the Si material, when Si and Li are alloyed, the amorphous state transits to the crystal state and the volume changes largely (about four times), and therefore, the cycle lifetime of the electrode deteriorates, which is a problem. In addition, in the case of the Si negative electrode active material, the capacity and the cycle durability are in the trade-off relation, and it has been difficult to improve the cycle durability while the high capacity is exhibited, which is a problem.

Here, International Publication No. WO2006/129415 discloses the invention whose object is to provide a nonaqueous electrolyte secondary battery including a negative electrode pellet with high capacity and excellent cycle lifetime. Specifically, silicon powder and titanium powder are mixed by a mechanical ironing method and crushed in a wet process so that a silicon-containing alloy is obtained. The silicon-containing alloy including a first phase mainly containing silicon and a second phase containing titanium silicide (such as $TiSi_2$) is used as the negative electrode active material. This literature also discloses that, in this case, at least one of these two phases is amorphous or low-crystalline.

SUMMARY

Examinations by the present inventors have revealed that the electrical device such as the lithium ion secondary battery including the negative electrode pellet according to International Publication No. WO2006/129415 exhibits the excellent cycle durability; however, the charging-discharging efficiency may be insufficient.

In view of the above, an object of the present invention is to provide a means that can achieve both the high cycle durability and the high charging-discharging efficiency of an electrical device such as a lithium ion secondary battery.

The present inventors have made concerted studies in order to achieve the above object. As a result, it has been found out that the above object can be achieved in the following manner: a silicon-containing alloy having a ternary alloy composition expressed by Si—Sn—Ti and including a structure in which a phase (hereinafter may be referred to as a-Si phase) mainly containing amorphous or low-crystalline silicon formed by dissolving tin in a crystal structure of silicon is dispersed in a parent phase of a silicide phase including titanium silicide is used as the negative electrode active material for an electrical device, and a relation between the peak intensity of a Si—O bond peak and the peak intensity of a Si—Si bond peak that are observed by XAFS measurement in the silicon-containing alloy is controlled. Thus, the present invention has been completed.

That is to say, the present invention relates to a negative electrode active material for an electrical device including the silicon-containing alloy. Specifically, a negative electrode active material includes a silicon-containing alloy including a structure in which a phase mainly containing amorphous or low-crystalline silicon formed by dissolving tin in a crystal structure of silicon is dispersed in a parent phase of a silicide phase including TiSi$_2$, and having a composition expressed by Chemical Formula (1):

$$Si_xSn_yTi_zA_a \qquad \text{Chemical Formula (1)}$$

(in the above Chemical Formula (1), A represents an inevitable impurity, x, y, z, and a represent values in mass %, and 0<x<100, 0<y<100, 0<z<100, and 0≤a<0.5, and x+y+z+a=100 are satisfied), wherein when a peak intensity of a Si—O bond peak that is observed at a position where an interatomic distance in a radial wave function observed by XAFS is 0.13 nm is S(1) and a peak intensity of a Si—Si bond peak that is observed at a position where the interatomic distance is 0.2 nm is S(2), a relation of S(2)>S(1) is satisfied.

According to the present invention, the progress of Si oxidation in the active material can be controlled to be a certain level or less. As a result, Li ions can be intercalated and deintercalated easily between Si and Si in charging and discharging. Thus, both the high cycle durability and the high charging-discharging efficiency of a lithium ion secondary battery or the like can be achieved.

DETAILED DESCRIPTION

Figure 1:
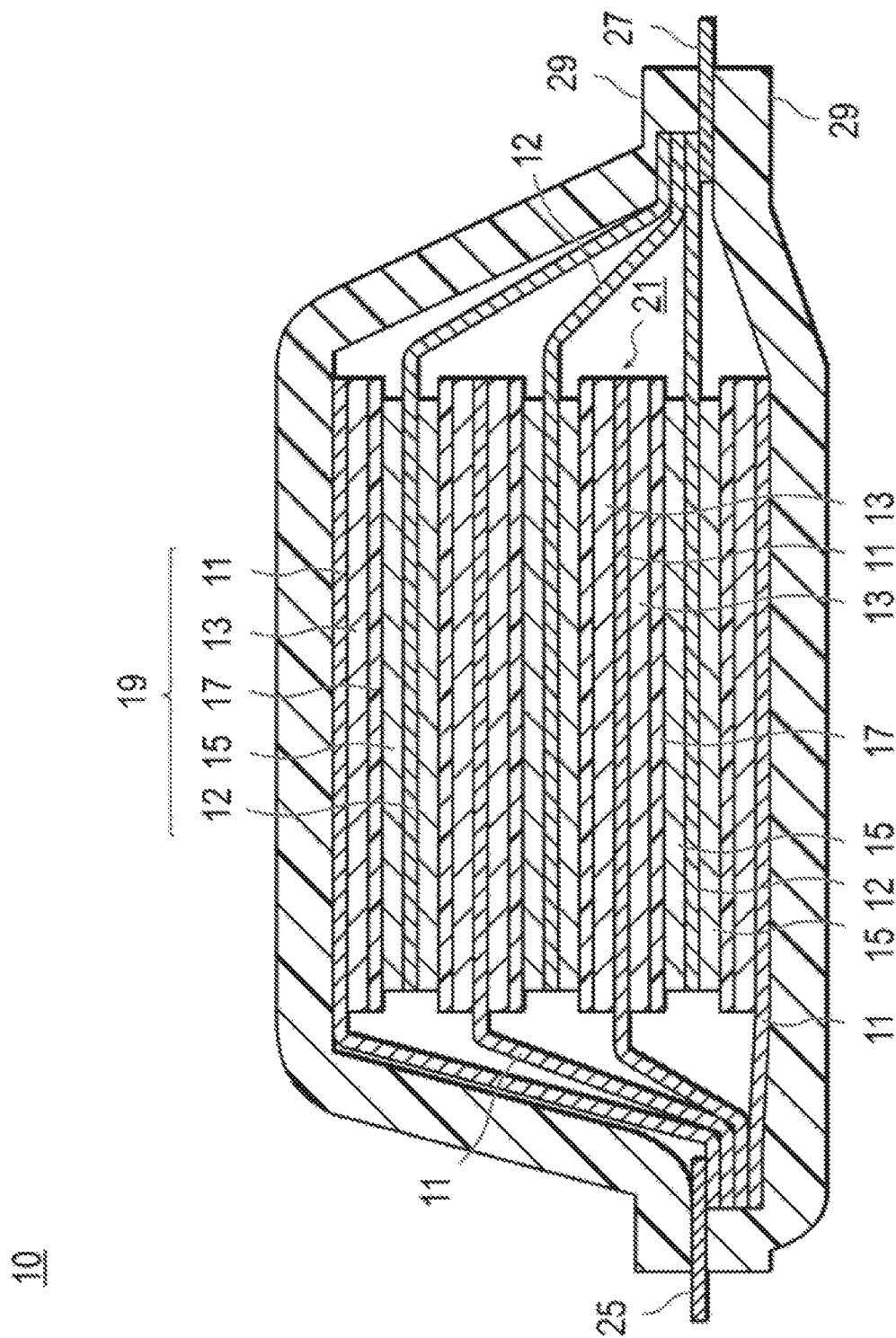
FIG. 1 is a cross-sectional view schematically illustrating an outline of a stacked flat non-bipolar lithium ion secondary battery corresponding to a typical embodiment of an electrical device according to the present invention.

An embodiment of a negative electrode active material for an electrical device and an electrical device including the same according to the present invention is hereinafter described with reference to the drawings. However, the technical range of the present invention should be determined based on the description of the scope of claims, and is not limited to the embodiment below only. In the description of the drawings, the same components are denoted by the same reference sign and the redundant description is not made. The size ratio of the components in the drawing may be exaggerated for the convenience of the description and the ratio may be different from the actual one.

A basic structure of an electrical device in which a negative electrode active material for an electrical device according to the present invention can be used is described with reference to drawings. In the present embodiment, a lithium ion secondary battery is described as an example of the electrical device.

First, in a negative electrode for a lithium ion secondary battery corresponding to one typical embodiment of a negative electrode including a negative electrode active material for an electrical device according to the present invention, and a lithium ion secondary battery including the negative electrode, the voltage of a cell (unit cell layer) is high and the high energy density and the high output density can be achieved. Therefore, the lithium ion secondary battery including the negative electrode active material for a lithium ion secondary battery according to the present embodiment is excellent as the battery for the use in the driving power source or the auxiliary power source of the vehicle. As a result, the present invention is suitably applicable to the lithium ion secondary battery for the driving power source of the vehicle, for example. In addition, the present invention is also applicable to the lithium ion secondary battery for a mobile device such as a mobile phone.

That is to say, it is only necessary that the lithium ion secondary battery to be a subject of the present embodiment is the lithium ion secondary battery including the negative electrode active material for a lithium ion secondary battery according to the present invention that is described below, and the other requirements are not limited in particular.

For example, if the lithium ion secondary battery is distinguished in point of mode and structure, the present invention is applicable to any conventionally known mode and structure such as a stacked (flat) battery or a wound (cylindrical) battery. The stacked (flat) battery structure is advantageous in cost and workability because the long-term reliability can be secured due to a sealing technique such as easy heat sealing.

From the aspect of an electric connection state (electrode structure) in the lithium ion secondary battery, the present invention is applicable to both a non-bipolar type (internal parallel connection type) battery and a bipolar type (internal serial connection type).

If the lithium ion secondary batteries are distinguished in point of the kind of the electrolyte layer in the lithium ion secondary battery, the present invention is applicable to any conventionally known type of electrolyte layer, for example, a solution electrolyte type battery including a solution electrolyte such as a nonaqueous electrolyte solution in an electrolyte layer, and a polymer battery including a polymer electrolyte in an electrolyte layer. The polymer battery is classified into a gel electrolyte battery including a polymer gel electrolyte (also referred to as gel electrolyte simply), and a solid polymer (all-solid) including a polymer solid electrolyte (also referred to as polymer electrolyte simply).

Therefore, in the following description, a non-bipolar (internal parallel connection type) lithium ion secondary battery including the negative electrode active material for a lithium ion secondary battery according to the present embodiment is briefly described with reference to the drawings. However, the technical range of the lithium ion secondary battery according to the present embodiment should not be limited to the description below.

<Overall Structure of Battery>

FIG. 1 is a cross-sectional view schematically illustrating an overall structure of a flat (stacked) lithium ion secondary battery (hereinafter also referred to as "stacked battery" simply) corresponding to a typical embodiment of an electrical device of the present invention.

As illustrated in FIG. 1, a stacked battery 10 according to the present embodiment has a structure in which a power generating element 21 with an approximately rectangular shape where a charging-discharging reaction progresses actually is sealed inside a laminate sheet 29 corresponding to a package. Here, the power generating element 21 has a structure in which a positive electrode where a positive electrode active material layer 15 is disposed on both surfaces of a positive electrode current collector 12, an electrolyte layer 17, and a negative electrode where a negative electrode active material layer 13 is disposed on both surfaces of a negative electrode current collector 11 are stacked. Specifically, one positive electrode active material layer 15 and the adjacent negative electrode active material layer 13 are disposed to face each other with the electrolyte layer 17 interposed therebetween, and the negative electrode, the electrolyte layer, and the positive electrode are stacked in this order.

Thus, the positive electrode, the electrolyte layer, and the negative electrode that are adjacent to each other constitute one unit cell layer 19. Therefore, the stacked battery 10 illustrated in FIG. 1 has a structure in which a plurality of such unit cell layers 19 is stacked and electrically connected in parallel to each other. Note that in the positive electrode current collectors in the outermost layers that are positioned in both outermost layers of the power generating element 21, the positive electrode active material layer 15 is disposed on only one surface; however, the active material layer may be provided on both surfaces. That is to say, instead of a current collector dedicated to the use for the outermost layer where the active material layer is provided on only one surface, the current collector having the active material layer on both surfaces may be used directly as the current collector of the outermost layer. In addition, the positive electrode and the negative electrode in FIG. 1 may be placed in the opposite arrangement, so that the negative electrode current collectors in the outermost layers come to both outermost layers of the power generating element 21. In this case, the negative electrode active material layer may be disposed on one surface or both surfaces of the negative electrode current collectors of the outermost layers.

The positive electrode current collector 12 and the negative electrode current collector 11 are respectively attached to a positive electrode current collecting plate 27 and a negative electrode current collecting plate 25 that are electrically connected to the electrodes (positive electrode and negative electrode). The positive electrode current collector 12 and the negative electrode current collector 11 are led out of the laminate sheet 29 while being held at an end of the laminate sheet 29. The positive electrode current collecting plate 27 and the negative electrode current collecting plate 25 may be respectively attached to the positive electrode current collector 12 and the negative electrode current collector 11 of the electrodes through a positive electrode lead and a negative electrode lead (not shown) as necessary by using ultrasonic welding or resistance welding, for example.

The lithium ion secondary battery described above is featured in the negative electrode. The main component members of the battery including the negative electrode are hereinafter described.

<Active Material Layer>

The active material layer 13 or 15 includes an active material, and moreover includes other additives as necessary.

[Positive Electrode Active Material Layer]

The positive electrode active material layer 15 includes the positive electrode active material.

(Positive Electrode Active Material)

Examples of the positive electrode active material include lithium-transition metal composite oxides such as $LiMn_2O_4$, $LiCoO_2$, $LiNiO_2$, $Li(Ni-Mn-Co)O_2$, and these oxides in which a part of the transition metal is replaced with another element, lithium-transition metal phosphate compounds, and lithium-transition metal sulfate compounds. In some cases, two or more kinds of positive electrode active materials may be used in combination. Preferably, the lithium-transition metal composite oxide is used as the positive electrode active material from the viewpoint of the capacity and the output characteristic. More preferably, a composite oxide containing lithium and nickel is used, and much more preferably, $Li(Ni-Mn-Co)O_2$ or this material in which a part of the transition metal is replaced with another element (hereinafter also referred to as "NMC composite oxide" simply) is used. The NMC composite oxide has a layered crystal structure in which lithium atomic layers and transition metal (Mn, Ni, and Co are arranged orderly) atomic layers are alternately stacked through oxygen atomic layers. One Li atom is included per atom of the transition metal M, and the amount of Li that can be extracted is twice as much as the spinel lithium manganese oxide, that is, the supply capability is doubled and thus, the high capacity is achieved.

The NMC composite oxide includes the composite oxide in which a part of the transition metal element is replaced with another metal element as described above. Other elements that are used in this case include Ti, Zr, Nb, W, P, Al, Mg, V, Ca, Sr, Cr, Fe, B, Ga, In, Si, Mo, Y, Sn, V, Cu, Ag, Zn, and the like. Preferably, Ti, Zr, Nb, W, P, Al, Mg, V, Ca, Sr, and Cr are used. Much more preferably, Ti, Zr, P, Al, Mg, and Cr are used. It is particularly preferable to use Ti, Zr, Al, Mg, and Cr from the viewpoint of improving the cycle characteristic.

Since the NMC composite oxide has high theoretical discharging capacity, the NMC composite oxide preferably has the composition expressed by General Formula (1): $Li_aNi_bMn_cCo_dM_xO_2$ (where a, b, c, d, and x satisfy $0.9 \leq a \leq 1.2$, $0 < b < 1$, $0 < c \leq 0.5$, $0 < d \leq 0.5$, $0 \leq x \leq 0.3$, and $b+c+d=1$, and M represents at least one kind of element selected from Ti, Zr, Nb, W, P, Al, Mg, V, Ca, Sr, and Cr). Here, a represents the atom ratio of Li, b represents the atom ratio of Ni, c represents the atom ratio of Mn, d represents the atom ratio of Co, and x represents the atom ratio of M. From the viewpoint of the cycle characteristic, $0.4 \leq b \leq 0.6$ is preferably satisfied in General Formula (1). Note that the compositions of the elements can be measured by, for example, plasma (ICP) emission spectrometry.

It is generally known that nickel (Ni), cobalt (Co), and manganese (Mn) contribute to the capacity and the output characteristic from the viewpoint of improving the purity of the material and improving the electron conductivity. Ti and the like are to replace a part of the transition metal in the crystal lattice. From the viewpoint of the cycle characteristic, a part of the transition element is preferably replaced with another metal element, and in particular, $0 < x \leq 0.3$ is preferably satisfied in General Formula (1). By dissolving at least one kind of element selected from the group consisting of Ti, Zr, Nb, W, P, Al, Mg, V, Ca, Sr, and Cr, the crystal structure is stabilized. Therefore, it is considered that the decrease in capacity of the battery can be prevented even after charging and discharging are repeated, and thus, the excellent cycle characteristic can be achieved.

In a more preferable embodiment, b, c, and d satisfy $0.44 \leq b \leq 0.51$, $0.27 \leq c \leq 0.31$, $0.19 \leq d \leq 0.26$ in General Formula (1) from the viewpoint of improving the balance between the capacity and the lifetime characteristic. For example, $LiNi_{0.5}Mn_{0.3}Co_{0.2}O_2$ is advantageous over $LiCoO_2$, $LiMn_2O_4$, $LiNi_{1/3}Mn_{1/3}Co_{1/3}O_2$, and the like that have already been used by consumers in that the capacity per unit weight is high and the energy density can be improved, so that a compact battery with high capacity can be manufactured. This is preferable also from the viewpoint of the endurance. In point of the high capacity, $LiNi_{0.8}Co_{0.1}Al_{0.1}O_2$ is more advantageous but not in the lifetime characteristic. On the other hand, $LiNi_{0.5}Mn_{0.3}Co_{0.2}O_2$ has the lifetime characteristic as high as $LiNi_{1/3}Mn_{1/3}Co_{1/3}O_2$.

In some cases, two or more kinds of positive electrode active materials may be used in combination. Preferably, from the viewpoint of the capacity and the output characteristic, the lithium-transition metal composite oxide is used as the positive electrode active material. Needless to say, other positive electrode active materials than those above can also be used.

The average particle diameter of the positive electrode active material included in the positive electrode active material layer 15 is not limited to a particular diameter, and is preferably 1 to 30 μm, more preferably 5 to 20 μm from the viewpoint of increasing the output. In the present specification, "particle diameter" refers to the maximum distance among distances between arbitrary two points on a border line of active material particles (observation surfaces) that are observed using an observing means such as a scanning electron microscope (SEM) or a transmission electron microscope (TEM). In the present specification, the value of "average particle diameter" is the value calculated as the average value of the particle diameters of several to several tens of particles observed using the observing means such as a scanning electron microscope (SEM) or a transmission electron microscope (TEM). The particle diameter or the average particle diameter of other components can also be defined similarly.

The positive electrode active material layer 15 may include a binder.

(Binder)

The binder is added for the purpose of binding between active materials or between the active material and the current collector to maintain the electrode structure. The binder used for the positive electrode active material layer is not limited to a particular kind, and examples thereof include the following materials: polyethylene, polypropylene, polyethylene terephthalate (PET), polyether nitrile (PEN), polyacrylonitrile, polyimide, polyamide, polyamideimide, cellulose, carboxymethyl cellulose (CMC), ethylene-vinylacetate copolymer, polyvinyl chloride, styrene-butadiene rubber (SBR), isoprene rubber, butadiene rubber, ethylene-propylene rubber, ethylene-propylene-diene copolymer, styrene-butadiene-styrene block copolymer and a hydrogenated substance thereof, styrene-isoprene-styrene block copolymer and a hydrogenated substance thereof, and other thermoplastic polymers; polyvinylidene fluoride (PVdF), polytetrafluoroethylene (PTFE), tetrafluoroethylene-hexafluoropropylene copolymer (FEP), tetrafluoroethylene-perfluoroalkylvinylether copolymer (PFA), ethylene-tetrafluoroethylene copolymer (ETFE), polychlorotrifluoroethylene (PCTFE), ethylene-chlorotrifluoroethylene copolymer (ECTFE), polyvinyl fluoride (PVF), and other fluorine resins; vinylidene fluoride-hexafluoropropylene fluorine rubber (VDF-HFP fluorine rubber), vinylidene fluoride-hexafluoropropylene-tetrafluoroethylene fluorine rubber (VDF-HFP-TFE fluorine rubber), vinylidene fluoride-pentafluoropropylene fluorine rubber (VDF-PFP fluorine rubber), vinylidene fluoride-pentafluoropropylene-tetrafluoroethylene fluorine rubber (VDF-PFP-TFE fluorine rubber), vinylidene fluoride-perfluoromethylvinylether-tetrafluoroethylene fluorine rubber (VDF-PFMVE-TFE fluorine rubber), vinylidene fluoride-chlorotrifluoroethylene fluorine rubber (VDF-CTFE fluorine rubber) and other vinylidene fluoride fluorine rubbers; and epoxy resins. Above all, polyvinylidene fluoride, polyimide, styrene-butadiene rubber, carboxymethyl cellulose, polypropylene, polytetrafluoroethylene, polyacrylonitrile, polyamide, and polyamideimide are preferable. These preferable binders have excellent heat resistance, a very wide potential window, and are stable for both the positive electrode potential and the negative electrode potential; thus, these binders can be used for the active material layer. Any one of these binders may be used alone or two kinds thereof may be used in combination.

The amount of binder included in the positive electrode active material layer is not limited to a particular amount and may be any amount that can bind the active material. The binder is contained preferably by 0.5 to 15 mass %, more preferably by 1 to 10 mass % in the active material layer.

The positive electrode (positive electrode active material layer) can be formed by a general method of applying (coating) slurry, or any other method such as a kneading method, a sputtering method, an evaporation method, a CVD method, a PVD method, an ion plating method, or a thermal spraying method.

[Negative Electrode Active Material Layer]

The negative electrode active material layer 13 includes the negative electrode active material.

(Negative Electrode Active Material)

In the present embodiment, the negative electrode active material includes a silicon-containing alloy. Description is hereinafter made of the composition, the structure, and the physical properties of the silicon-containing alloy according to the present embodiment.

[Composition of Silicon-Containing Alloy]

The silicon-containing alloy included in the negative electrode active material according to the present embodiment has a ternary alloy composition that is expressed by Si—Sn—Ti. More specifically, the silicon-containing alloy included in the negative electrode active material according to the present embodiment has the composition expressed by the following Chemical Formula (1).

$$Si_xSn_yTi_zA_a \quad \text{Chemical Formula (1)}$$

In the above Chemical Formula (1), A represents an inevitable impurity, x, y, z, and a represent values in mass %, and $0<x<100$, $0<y<100$, $0<z<100$, and $0 \leq a<0.5$, and $x+y+z+a=100$ are satisfied.

As is clear from Chemical Formula (1), the silicon-containing alloy according to the present embodiment (having the composition of $Si_xSn_yTi_zA_a$) is a ternary system of Si, Sn, and Ti. With such a composition, the high cycle durability can be achieved. In the present specification, "inevitable impurity" refers to the impurity that exists in the raw materials of the silicon-containing alloy or impurities that are mixed inevitably in a manufacturing process. The inevitable impurities are unnecessary originally; however, the inevitable impurities are allowed because the amount is small and there is no influence on the characteristic of the Si alloy.

In the present embodiment, by selecting Ti as the element to be added to the negative electrode active material (silicon-containing alloy), the amorphous-crystal phase transition in the formation of the Li alloy can be suppressed and the cycle lifetime can be improved. In addition, accordingly, the capacity becomes higher than that of a conventional negative electrode active material (for example, carbon-based negative electrode active material).

Here, in the Si-based negative electrode active material, when Si and Li are alloyed in the charging, the Si phase changes from the amorphous state to the crystal state and the volume changes largely (about four times). As a result, the active material particles are broken and the function as the active material is lost, which is a problem. In view of this, by suppressing the amorphous-crystal phase transition in the Si phase in the charging, the breaking of the particles can be suppressed, the function as the active material (high capacity) can be maintained, and the cycle lifetime can be improved.

As described above, the silicon-containing alloy according to the present embodiment (having the composition of $Si_xSn_yTi_zA_a$) is the ternary system of Si, Sn, and Ti. Here, the total of the constituent ratios of the constituent elements (mass ratios of x, y, and z) are 100 mass %, and there is no particular limitation on the values of x, y, and z. From the viewpoint of the balance between the initial capacity and keeping the durability against the charging and discharging (intercalation and deintercalation of Li ions), x preferably satisfies $60 \leq x \leq 73$, more preferably $60 \leq x \leq 70$, and much more preferably $60 \leq x \leq 65$. In addition, from the viewpoint of enabling irreversible intercalation and deintercalation of Li ions in the charging and discharging by dissolving into the Si phase so as to increase the distance between the Si regular tetrahedrons in the Si phase, y preferably satisfies $2 \leq y \leq 15$, more preferably $2 \leq y \leq 10$, and much more preferably $5 \leq y \leq 10$. Furthermore, from the viewpoint of the balance between the initial capacity and keeping the durability against the charging and discharging (intercalation and deintercalation of Li ions) like x, z preferably satisfies $25 \leq z \leq 35$, more preferably $27 \leq z \leq 33$, and much more preferably $28 \leq z \leq 30$. When silicon is used as the main component, Ti is contained relatively much, and Sn is also contained to some extent in this manner, the microstructure of the silicon-containing alloy according to the present embodiment can be achieved more easily. However, the numeral range of the constituent ratios of the constituent elements described above is merely the one for describing the preferred embodiment, and any numeral range in the scope of claims is included within the technical range of the present invention.

Note that A is the impurity (inevitable impurity) other than the above three components that is derived from the raw material or the manufacturing process. It is preferable that a satisfies $0 \leq a < 0.5$, and more preferably $0 \leq a < 0.1$. Whether the negative electrode active material (silicon-containing alloy) has the composition of Chemical Formula (1) can be checked by the qualitative analysis by X-ray fluorescence (XRF) analysis and the quantitative analysis by the inductively coupled plasma (ICP) optical emission spectrometry.

[Structure of Silicon-Containing Alloy]

Subsequently, the silicon-containing alloy included in the negative electrode active material according to the present embodiment is also featured in having the structure in which the a-Si phase mainly containing amorphous or low-crystalline silicon is dispersed in a silicide phase. That is to say, one feature of the silicon-containing alloy according to the present embodiment is what is called a sea-island structure in which islands of the a-Si phase as the dispersed phase are dispersed in the sea of the silicide phase as the continuous phase. Whether the silicon-containing alloy has such a microstructure can be checked by, for example, observing the silicon-containing alloy using a high-angle annular dark field scanning transmission electron microscope (HAADF-STEM) and then performing element intensity mapping by energy dispersive X-ray spectrometry (EDX) in the same field as that in the observed image.

<a-Si Phase>

Here, in the silicon-containing alloy according to the present embodiment, the a-Si phase is the phase including amorphous or low-crystalline silicon that is formed by dissolving tin in the silicon crystal structure. This a-Si phase is the phase involved with the intercalation and deintercalation of lithium ions when the electrical device (lithium ion secondary battery) according to the present embodiment is in operation, and is the phase that can react with lithium electrochemically (that is, can intercalate and deintercalate a large amount of lithium per weight and volume). Inside the silicon crystal structure of the a-Si phase, tin is dissolved. However, since silicon is low in electron conductivity, a small amount of additive elements, transition metal, or the like, for example phosphorus or boron, may be included in a parent phase. The size of the a-Si phase is not limited to a particular size; however, from the viewpoint of suppressing the expansion in the charging, the size is preferably smaller, specifically 10 nm or less, and more preferably 8 nm or less. A lower-limit value of the size of the a-Si phase is not limited to a particular value; however, the lower-limit value is preferably is 1 nm or more, more preferably 2 nm or more, much more preferably 5 nm or more, and particularly preferably 8 nm or more. In regard to the value of the diameter of the a-Si phase, the EDX element mapping of Si with a high magnification (25 nm scale bar) and the EDX element mapping of Ti in HAADF-STEM are compared. A region where Si exists and Ti does not exist is regarded as the Si phase and $\frac{1}{10}$ of the maximum value of the intensity is the threshold in the EDX element mapping of Ti. A binarizing image process is performed on the region where the intensity is less than or equal to this threshold. The arithmetical mean value of the measurement values can be obtained by measuring five or more phases by a method of reading the dimensions of the Si-phases from the obtained binarized image. Similarly, in regard to the value of the diameter of the silicide phase to be described below, the EDX element mapping of Si with a high magnification (25 nm scale bar) and the EDX element mapping of Ti in Cs-STEM are compared. A region where Si exists and Ti also exists is regarded as the silicide phase and $\frac{1}{10}$ of the maximum value of the intensity is the threshold in the EDX element mapping of Ti. A binarizing image process is performed on the region where the intensity is more than or equal to this threshold. The arithmetical mean value of the measurement values can be obtained by measuring five or more phases by a method of reading the dimensions of the silicide phases from the obtained binarized image.

This a-Si phase is preferably more amorphous than the silicide phase to be described below. With such a structure, the negative electrode active material (silicon-containing alloy) can have higher capacity. Note that whether the a-Si phase is more amorphous than the silicide phase can be determined from the diffraction diagram obtained by performing fast Fourier transformation (FFT) on the observed images of the a-Si phase and the silicide phase with the high-angle annular dark field scanning transmission electron microscope (HAADF-STEM). That is to say, the diffraction pattern appearing in this diffraction diagram exhibits a net pattern of two-dimensional dot arrangement (lattice-form spots) in regard to a single-crystal phase, a Debye-Scherrer ring (diffraction ring) in regard to a polycrystalline phase, and a halo pattern in regard to the amorphous phase. By using this, the above determination can be performed. In the present embodiment, the a-Si phase may be either amorphous or low-crystalline, and from the viewpoint of achieving the higher cycle durability, the a-Si phase is preferably amorphous.

The silicon-containing alloy according to the present embodiment necessarily contains tin; however, since tin does not form a silicide with silicon, tin exists not in the silicide phase but in the a-Si phase. In a case where tin is contained in a small amount, all the tin elements exist in the dissolved state in the silicon crystal structure in the a-Si phase. On the other hand, when tin is contained in a larger amount, the tin elements that cannot be dissolved in the silicon of the a-Si phase are aggregated and exist as the crystal phase of tin alone. In the present embodiment, it is preferable that the crystal phase of only tin does not exist.

<Silicide Phase>

On the other hand, the silicide phase included in the sea (continuous phase) of the sea-island structure described above is the crystal phase mainly containing the silicide (silicide) of titanium. This silicide phase has excellent affinity to the a-Si phase because of containing titanium silicide, and in particular, can suppress the crack at the crystal interface when the expansion in volume occurs in charging. In addition, the silicide phase is superior to the a-Si phase in electron conductivity and hardness. In this manner, the silicide phase also plays a role of improving the low electron conductivity of the a-Si phase and maintaining the shape of the active material against the stress in the expansion. In the present embodiment, the silicide phase with such a characteristic forms the sea (continuous phase) of the sea-island structure. Therefore, the electron conductivity of the negative electrode active material (silicon-containing alloy) can be improved further, and additionally, the stress in the expansion of the a-Si phase can be relieved to prevent the cracking of the active material. Accordingly, the cycle durability can be improved.

The silicide phase may include a plurality of phases, and for example, may include two or more phases in which the composition ratio between Ti and Si is different (for example, $TiSi_2$ and TiSi). When forming the silicide, Ti exhibits higher electron conductivity than silicides of other elements and has higher strength. In particular, $TiSi_2$ as one kind of silicide is preferable because of exhibiting excellent electron conductivity. In view of such a characteristic of the silicide and the excellent characteristic of the amorphous Si described above, it is preferable that the silicide is $TiSi_2$ and the a-Si phase is amorphous.

In particular, in a case where the silicide phase includes two or more phases with the different composition ratio (for example, $TiSi_2$ and TiSi), 50 mass %, preferably 80 mass %, more preferably 90 mass %, particularly preferably 95 mass %, and the most preferably 100 mass % of the silicide phase is the $TiSi_2$ phase.

There is no particular limitation on the size of the silicide phase. In a preferred embodiment, however, the size of the silicide phase is 50 nm or less, more preferably 30 nm or less, and much more preferably 25 nm or less. With such a structure, the negative electrode active material (silicon-containing alloy) can have higher capacity. On the other hand, there is no particular limitation on a lower limit value of the size of the silicide phase. However, from the viewpoint of suppressing the expansion and contraction of the a-Si phase along with the intercalation and deintercalation of Li, the diameter of the silicide phase is preferably larger than the diameter of the a-Si phase described above, and the absolute value thereof is preferably 10 nm or more and more preferably 15 nm or more.

Note that there are two kinds of crystal structures of titanium disilicide ($TiSi_2$): C49 structure and C54 structure. The C49 structure is a phase exhibiting a resistivity as high as 60 μΩ·cm (metastable phase), and has a base—centered orthorhombic lattice structure. On the other hand, the C54 structure is a phase exhibiting a resistivity as low as 15 to 20 μΩ·m (stable phase) and has a face—centered orthorhombic lattice structure. Here, the crystal structure of the disilicide ($TiSi_2$) included in the silicide phase of the silicon-containing alloy (negative electrode active material) according to the present embodiment is preferably the C54 structure. As compared to the C49 structure, the disilicide ($TiSi_2$) with the C54 structure has low resistivity and high hardness. Therefore, the negative electrode active material according to the present embodiment exhibits the high electron conductivity and has an excellent effect of relieving the stress generated in the expansion and contraction of the a-Si phase in the active material during the charging and discharging. This also contributes to the high cycle durability. In view of the above, in the preferred embodiment of the present invention, when the titanium silicide in the silicide phase is titanium disilicide ($TiSi_2$), $TiSi_2$ with the C54 structure is the main component (50 mass % in mass ratio). Here, "main component" means that the mass ratio of $TiSi_2$ with the C54 structure in 100 mass % of the silicide phase is more than 50 mass %, preferably 80 mass % or more, more preferably 90 mass %, particularly preferably 95 mass %, and the most preferably 100 mass %.

[Relation of Peak Intensity of Silicon-Containing Alloy]

In the present embodiment, the silicon-containing alloy is also featured in that when the peak intensity of the Si—O bond peak is S(1) and the peak intensity of the Si—Si bond peak is S(2), the relation of S(2)>S(1) is satisfied. Here, the peak intensity value of the silicon-containing alloy is measured by XAFS analysis. Specifically, the peak intensity of the Si—O bond peak that is observed at a position where the interatomic distance in the radial wave function observed by XAFS analysis is 0.13 nm is S(1) and the peak intensity of the Si—Si bond peak that is observed at a position where the interatomic distance is 0.2 nm is S(2), and then these peak intensity values satisfy a relation of S(2)>S(1).

Figure 3:
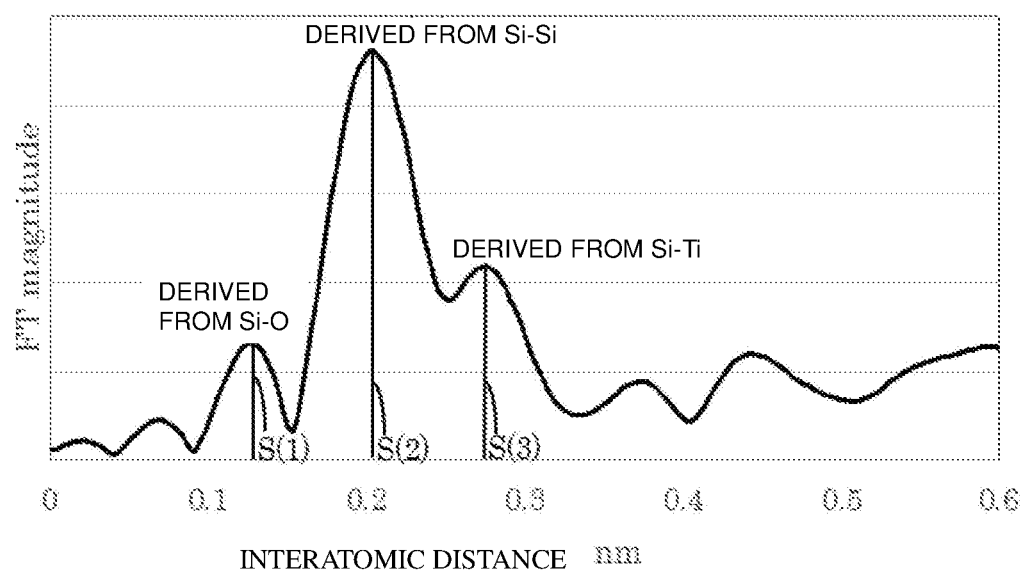
FIG. 3 is a graph of a radial wave function spectrum that is observed by EXAFS regarding one example of a negative electrode active material for the electrical device according to the present invention.

In the present measurement, the XAFS measurement is performed by a fluorescence method using a negative electrode for a coin-cell, and thus the XAFS spectra are obtained as described in Example. Next, among the obtained XAFS spectra, the EXAFS vibration observed on the high-energy side is subjected to the Fourier transformation; thus, the radial wave function is obtained. As shown in FIG. 3, the Si—O bond correlation is observed as a first approximation peak (around 0.13 nm), the Si—Si bond correlation is observed as a second approximation peak (around 0.2 nm), and the Si—Ti bond correlation is observed as a third approximation peak (around 0.28 nm) in the radial wave function. The peak intensities and the peak intensity ratios are obtained from the radial wave function spectrum. In the present invention, "peak intensity" means the absolute value of the distance between the peak and the intersection between a horizontal axis and a vertical line drawn from the peak to the horizontal axis.

Since the values of the peak intensities satisfy the relation of S(2)>S(1), the high cycle durability and charging-discharging efficiency are achieved. That is to say, when the surface of Si is oxidized by oxygen in the air, an oxide film (Si—O) is formed on the surface. In the charging and discharging, the oxide film on the surface of Si becomes a resisting component when Li ions are intercalated into Si or deintercalated from Si, and in this case, the charging-discharging efficiency of the electrical device deteriorates. In addition, when the peak intensity S(1) derived from (Si—O) increases, it means that the oxidation of Si progresses. In this case, the progress of the oxidation of Si can be controlled to be a certain level or less when the peak intensity S(1) of the Si—O bond peak and the peak intensity S(2) of the Si—Si bond peak satisfy the relation of S(2)>S(1). As a result, in the charging and discharging, Li ions can be intercalated and deintercalated between Si—Si easily and thus, the negative electrode and the electrical device including the negative electrode active material according to the present embodiment can have much higher cycle durability and charging-discharging efficiency.

In the preferred embodiment of the present invention, when the peak intensity of the Si—Ti bond peak that is observed at a position where the interatomic distance in the radial wave function observed by XAFS is 0.28 nm is S(3), it is preferable that a relation of S(2)>S(3)≥S(1) is satisfied and more preferable that a relation S(2)>S(3)>S(1) is satisfied. Here, when the peak intensity of the Si—Ti bond increases, it suggests that the formation of TiSi$_2$ progresses. When a wall material of TiSi$_2$ that is hard exists by a certain amount or more, an effect of improving the cycle durability is obtained. As a result of demonstrating these effects in total, when the relation S(2)>S(3)≥S(1) is satisfied, the cycle curability and the charging-discharging efficiency of the electrical device can be improved further. In addition, it is preferable that the relation of S(2)>S(3)>S(1) is satisfied because the electrical device can have particularly high cycle durability and charging-discharging efficiency.

The order of the peak intensities of the bonds can be converted into the peak intensity ratio, and the result can be regarded as the peak intensity ratio of each bond and used to define the present invention. That is to say, in regard to S(1) and S(2) of the silicon-containing alloy according to the present invention, the peak intensity ratio (S(1)/S(2)) is less than 1. From the viewpoint of the performance of the electrical device, it is more preferable that this peak intensity ratio (S(1)/S(2)) is less than 0.5. In the preferred embodiment of the present invention, the peak intensity ratio of S(3) to S(2) (S(3)/S(2)) is preferably more than 0.31. In a case where the peak intensity ratio of the bond is in the above-described range, the cycle durability and the charging-discharging efficiency of the electrical device are particularly preferable.

Regarding the requirements of the composition, the structure, and the physical properties of the negative electrode active material, there is no particular limitation on the controlling means to satisfy the requirements. However, it is possible to control so as to satisfy the requirements by adjusting the composition of the raw material used in manufacturing the silicon-containing alloy, employing a manufacturing method according to another embodiment of the present invention to be described below, or when the amount of Ti to be mixed is constant, mixing Sn in a relatively small amount.

The particle diameter of the silicon-containing alloy in the negative electrode active material in the present embodiment is not limited to a particular diameter; however, the average particle diameter is preferably 0.1 to 20 μm, more preferably 0.2 to 10 μm.

(Manufacturing Method for Negative Electrode Active Material)

The manufacturing method for the negative electrode active material for the electrical device according to the present embodiment is not limited to a particular method and a public knowledge may be referred to. In the present application, description is made of one example of the manufacturing method for the negative electrode active material including the silicon-containing alloy including a structure in which the a-Si phase is dispersed in the silicide phase and the peak intensity values satisfy the predetermined relations, and in this example, a mechanical ironing process of a high energy type can be employed. Specifically, the mechanical ironing process is performed on the powder of a master alloy having the same composition as the silicon-containing alloy by using a ball mill device that can apply a centrifugal force of 15 [G] or more; thus, the negative electrode active material for an electrical device including the silicon-containing alloy can be obtained. In this manner, by manufacturing the negative electrode active material (silicon-containing alloy) through the mechanical ironing process with the use of the ball mill device that can apply a relatively high centrifugal force, the alloy with the microstructure described above can be manufactured. In addition, this manufacturing method enables the control so that the peak intensity values in the obtained alloy satisfy the predetermined relations and therefore can effectively contribute to both the cycle durability and the charging-discharging efficiency of the negative electrode active material. The manufacturing method is hereinafter described in more detail. However, the manufacturing method below is merely an example for manufacturing the present embodiment and may be any other method that can manufacture the negative electrode active material according to the present invention without a particular limitation.

First, in order to obtain the master alloy, high-purity powder of raw materials of silicon (Si), tin (Sn), and titanium (Ti) is prepared as the raw materials.

Subsequently, the mechanical ironing process is performed using the powder of the raw materials prepared as above.

By performing the alloying process through the mechanical ironing process, the phase state can be controlled easily. Thus, in the mechanical ironing process, the alloying can be performed by putting crushing balls and the powder of the raw materials of the alloy into a crushing pot and energy is applied to the powder using the ball mill device. That is to say, heat is generated by applying the energy and the powder of the raw materials is alloyed and the a-Si phase becomes amorphous, tin is dissolved into the phase, and the silicide phase is formed progressively.

The manufacturing method according to the present embodiment is featured in that the centrifugal force applied to the content by the ball mill device used in the mechanical ironing process is more than or equal to 15 [G]. By performing the mechanical ironing process with the use of the ball mill device that can apply a relatively high centrifugal force, the silicon-containing alloy (negative electrode active material) that can achieve the equal or higher cycle durability can be manufactured in a shorter time. In addition, Sn, which is the raw material that is relatively expensive, is used less; therefore, the cost for manufacturing the silicon-containing alloy (negative electrode active material) can be reduced. Note that the value of the centrifugal force is preferably 50 [G] or more, more preferably 100 [G] or more, much more preferably 120 [G] or more, particularly preferably 150 [G] or more, and the most preferably 175 [G] or more. On the other hand, the upper limit value of the centrifugal force is not limited to a particular value; however, the upper limit value is usually about 200 [G] practically.

The value of the centrifugal force that is applied to the content in the ball mill device is calculated by the following expression:

[Mathematical Formula 1]
$$Gn1 = \left[rs - \left\{rp1 \cdot \left(\frac{rp1}{rs} \cdot (1+iw)^2\right)\right\}\right] \cdot \frac{\left(2 \cdot \pi \cdot \frac{rpm}{60}\right)^2}{9.81}$$

In this expression, Gn1 represents the centrifugal force [G], rs represents the revolution radius [m], rp1 represents the rotation radius [m], iw represents the rotation-revolution ratio [-], and rpm represents the number of rotations per minute [rotations/min]. Therefore, it is understood that as the revolution radius rs is larger, the rotation radius rp1 is smaller, and the number of rotations is larger, the value of the centrifugal force Gn1 is larger.

There is no particular limitation on the specific structure of the ball mill device, and a conventionally known ball mill device such as a planetary ball mill device or a mixing ball mill device that satisfies the requirements for the centrifugal force described above can be used. However, in the manufacturing method according to the present embodiment, the mixing ball mill device is preferably used. This mixing ball mil device includes a container with a cylindrical inner surface, and a mixing impeller provided in this container. Inside the container of the mixing ball mill device, the powder of the raw materials, balls, a solvent, and a processing agent are input. Differently from the planetary ball mill device, not the container but the mixing impeller in the container is rotated to alloy the powder of the raw materials. By using such a mixing ball mill device, the content of the container can be vigorously mixed by the mixing impeller. Therefore, the centrifugal force larger than that of another ball mill device can be applied to the content of the container.

Note that, in general, as the mechanical ironing process is performed longer, the silicon-containing alloy having the more preferable microstructure can be obtained. In the manufacturing method according to the present embodiment, however, the mechanical ironing process is performed so that the relatively high centrifugal force is applied to the content as described above. Therefore, the equal or higher cycle durability can be achieved in a shorter time of the mechanical ironing process. From this aspect, in the manufacturing method according to the present embodiment, the mechanical ironing process is performed preferably for 45 hours or less, more preferably 40 hours or less, much more preferably 36 hours or less, further preferably 30 hours or less, particularly preferably 24 hours or less, and the most preferably 20 hours or less. A lower limit value of the time of the mechanical ironing process is not limited to a particular time and may be usually 12 hours or more.

In addition, since the alloying process can be performed in a shorter time by applying the high energy, the progress of the Si oxidation can be suppressed and therefore, it is possible to control so that the peak intensity values satisfy the predetermined relations. From this aspect, it is preferable to obtain the silicon-containing alloy according to the present invention by increasing the value of the centrifugal force of the device used in the mechanical ironing process as described above.

In the mechanical ironing process using the ball mill device, the powder of the raw materials can be alloyed using the conventionally known balls. Preferably, the balls are titanium or zirconia balls with a diameter of 1 mm or less, particularly 0.1 to 1 mm. In particular, in the present embodiment, titanium balls manufactured by a plasma rotating electrode process are preferably used. The titanium or zirconia balls with a diameter of 1 mm or less manufactured by the plasma rotating electrode process have a uniform spherical shape, and are particularly preferable as the balls to obtain the silicon-containing alloy.

In the present embodiment, the solvent to be input to the container of the mixing ball mill is not limited to a particular solvent. Examples of the solvent include water (particularly, ion exchange water), methanol, ethanol, propanol, butanol, pentanol, dimethyl ketone, diethyl ketone, diethyl ether, dimethyl ether, diphenyl ether, toluene, and xylene. The solvents can be used alone or in combination with another as appropriate.

In addition, in the present invention, the processing agent to be put into the container is not limited to a particular processing agent. Examples of the processing agent include carbon powder that is used to prevent the adhesion of the content on the inner wall of the container, and a surfactant and/or fatty acid.

The mechanical ironing process by the above procedure is usually performed under a dry atmosphere, and the particle size distribution after the mechanical ironing process may vary largely. Therefore, it is preferable to perform a crushing process and/or a classifying process in order to homogenize the particle size.

Beside the manufacturing method described above, the mechanical ironing process can be performed after rapid solidification or the like. Through the rapid solidification, Si can be made amorphous and $TiSi_2$ can be alloyed in the initial state as compared with the case in which the alloying is formed from the powder. Therefore, the alloying process can be performed in a shorter time. In addition, the steps can be combined as appropriate as long as the negative electrode active material according to the present invention can be manufactured.

The predetermined alloy that is necessarily included in the negative electrode active material layer has been described. However, the negative electrode active material layer may include another negative electrode active material. Examples of the negative electrode active material other than the predetermined alloy include carbons such as natural carbon, synthetic carbon, carbon black, activated carbon, carbon fiber, coke, soft carbon, and hard carbon, pure metal of Si, Sn, or the like, the alloy-based active material whose composition ratio is not the above predetermined composition ratio, metal oxides such as $TiO$, $Ti_2O_3$, $TiO_2$, $SiO_2$, $SiO$, or $SnO_2$, a composite oxide of lithium and a transition metal (compound nitride) such as $Li_{4/3}Ti_{5/3}O_4$ or $Li_7MnN$, Li—Pb-based alloy, Li—Al-based alloy, and Li. However, from the viewpoint of sufficiently achieving the operation effect obtained by using the predetermined alloy as the negative electrode active material, the predetermined alloy is contained by preferably 50 to 100 mass %, more preferably 80 to 100 mass %, more preferably 90 to 100 mass %, particularly preferably 95 to 100 mass %, and the most preferably 100 mass % in 100 mass % of the negative electrode active material.

Next, the negative electrode active material layer 13 may contain a binder.

(Binder)

The binder is added for the purpose of binding between the active materials or between the active material and the current collector to maintain the electrode structure. The kind of the binder to be used for the negative electrode active material layer is not limited to a particular kind and may be similar to those described above that can be used for the positive electrode active material layer. Thus, the detailed description is omitted.

The amount of binder in the negative electrode active material layer is not limited to a particular amount and may be any amount that can bind the active material. Preferably, the binder is contained by 0.5 to 20 mass %, more preferably 1 to 15 mass % in the negative electrode active material layer.

(Requirements Common to Positive Electrode and Negative Electrode Active Material Layers 15 and 13)

The requirements common to the positive electrode and negative electrode active material layers 15 and 13 are described below.

The positive electrode active material layer 15 and the negative electrode active material layer 13 contain a conductive agent, an electrolyte salt (lithium salt), an ion conductive polymer, and the like.

Conductive Agent

The conductive agent is an additive that is mixed in order to improve the conductivity of the positive electrode active material layer or the negative electrode active material layer. The conductive agent is a carbon material, for example, carbon black such as acetylene black, graphite, or vapor grown carbon fiber. When the active material layer contains the conductive agent, an electron network is effectively formed inside the active material layer and the output characteristic of the battery is improved.

The conductive agent mixed into the active material layer is contained by preferably 1 mass % or more, more preferably 3 mass % or more, and much more preferably 5 mass % or more in the total amount of active material layer. In addition, the conductive agent mixed into the active material layer is contained by preferably 15 mass % or less, more preferably 10 mass % or less, and much more preferably 7 mass % or less in the total amount of active material layer. The negative electrode active material including the silicon-containing alloy described above has the low electron conductivity and the electrode resistance can be reduced depending on the amount of conductive agent. Thus, the effect as below can be achieved by setting the mixing ratio (content amount) of the conductive agent in the active material layer to be within the above range. That is to say, without interrupting the electrode reaction, the electron conductivity can be secured sufficiently and the decrease in energy density due to the decrease in electrode density can be suppressed. Furthermore, the higher energy density by the higher electrode density can be achieved.

Alternatively, a conductive binder having both functions of the conductive agent and the binder may be used instead of the conducive agent and the binder or may be used in combination with one of or both the conductive agent and the binder. As the conductive binder, TAB-2 (Hohsen Corp.) that is commercially available can be used.

Electrolyte Salt (Lithium Salt)

Examples of the electrolyte salt (lithium salt) include $Li(C_2F_5SO_2)_2N$, $LiPF_6$, $LiBF_4$, $LiClO_4$, $LiAsF_6$, and $LiCF_3SO_3$.

Ion Conductive Polymer

Examples of the ion conductive polymer include polyethylene oxide (PEO)-based and polypropylene oxide (PPO)-based polymers.

The mixing ratio of the components included in the positive electrode active material layer and the negative electrode active material layer is not limited to a particular ratio. The mixing ratio can be adjusted by referring to a public knowledge about the nonaqueous electrolyte secondary batteries.

The thickness of each active material layer (active material layer on one surface of current collector) is not limited to a particular thickness, and may be determined by referring to a public knowledge about the batteries. In one example, the thickness of each active material layer is usually approximately 1 to 500 μm, preferably 2 to 100 μm in consideration of the purpose of using the battery (output is important or energy is important) and the ion conductivity.

<Current Collector>

The current collectors 11 and 12 are each formed of a conductive material. The size of the current collector is determined in accordance with the purpose of using the battery. For example, when the current collector is used for a large battery that requires high energy density, the current collector with a large area is used.

The thickness of the current collector is not limited to a particular thickness. The thickness of the current collector is usually approximately 1 to 100 μm.

The shape of the current collector is not limited to a particular shape. The stacked battery 10 illustrated in FIG. 1 may be a current collecting foil or a meshed shape (expanded grid), for example.

Note that in a case of forming the negative electrode active material including thin-film alloy directly on the negative electrode current collector 12 by a sputtering method or the like, it is desirable to use a current collecting foil.

The material of the current collector is not limited to a particular material. Examples thereof include metal, and resin in which conductive filler is added to a conductive polymer material or a non-conductive polymer material.

Specifically, aluminum, nickel, iron, stainless steel, titanium, copper, and the like are given as the metal. In addition, a clad material of nickel and aluminum, a clad material of copper aluminum, a plated material of these metals in combination, and the like are preferably used. A foil formed by covering a surface of the metal with aluminum may be used. Above all, aluminum, stainless steel, copper, and nickel are preferable from the viewpoint of the electron conductivity, the battery operating potential, and the adhesion of the negative electrode active material by sputtering on the current collector.

Examples of the conductive polymer material include polyaniline, polypyrrole, polythiophene, polyacetylene, polyparaphenylene, polyphenylene vinylene, polyacrylonitrile, and polyoxadiazole. Such conductive polymer materials have sufficient conductivity without the conductive filler and are therefore advantageous in facilitating the manufacturing process or reducing the weight of the current collector.

Examples of the non-conductive polymer material include polyethylene (such as PE; high-density polyethylene (HDPE) and low-density polyethylene (LDPE)), polypropylene (PP), polyethylene terephthalate (PET), polyether nitrile (PEN), polyimide (PI), polyamideimide (PAI), polyamide (PA), polytetrafluoroethylene (PTFE), styrene-butadiene rubber (SBR), polyacrylonitrile (PAN), polymethylacrylate (PMA), polymethylmethacrylate (PMMA), polyvinyl chloride (PVC), polyvinylidene fluoride (PVdF), and polystyrene (PS). Such non-conductive polymer materials can have excellent potential resistance and solvent resistance.

To the conductive polymer material or the non-conductive polymer material described above, conductive filler can be added if necessary. In particular, in a case where the resin to be the base material of the current collector is formed of the non-conductive polymer only, the conductive filler is necessary in order to add the conductivity to the resin.

Any material with the conductivity can be used as the conductive filler without a particular limitation. For example, as the material with the excellent conductivity, potential resistance, or lithium blocking property, metal, conductive carbon, and the like are given. The metal is not limited to a particular metal and preferably contains at least one kind of metal selected from the group consisting of Ni, Ti, Al, Cu, Pt, Fe, Cr, Sn, Zn, In, Sb, and K, or alloy or metal oxide containing any of these metals. The conductive carbon is not limited to a particular carbon, and preferably contains at least one kind selected from the group consisting of acetylene black, VULCAN, BLACK PEARLS, carbon nanofiber, Ketjen black, carbon nanotube, carbon nanohorn, carbon nanobaloon, and fullerene.

The amount of conductive filler to be added is not limited to a particular amount and may be any amount that can add sufficient conductivity to the current collector. The conductive filler is added usually by approximately 5 to 35 mass %.

<Electrolyte Layer>

As the electrolyte of the electrolyte layer 17, liquid electrolyte or polymer electrolyte can be used.

The liquid electrolyte is in a state that lithium salt (electrolyte salt) is dissolved in an organic solvent. Examples of the organic solvent include carbonates such as ethylene carbonate (EC), propylene carbonate (PC), butylene carbonate (BC), vinylene carbonate (VC), dimethyl carbonate (DMC), diethyl carbonate (DEC), ethylmethyl carbonate (EMC), and methylpropyl carbonate (MPC). The organic solvents may be used alone or two or more of them may be used in combination.

The lithium salt may be a compound that can be added to the active material layer of the electrode, such as $Li(CF_3SO_2)_2N$, $Li(C_2F_5SO_2)_2N$, $LiPF_6$, $LiBF_4$, $LiAsF_6$, $LiTaF_6$, $LiClO_4$, and $LiCF_3SO_3$.

On the other hand, the polymer electrolytes are classified into a gel electrolyte including electrolyte solution and an intrinsic polymer electrolyte not including the electrolyte solution.

The gel electrolyte has a structure in which a liquid electrolyte (electrolyte solution) is poured into a matrix polymer including an ion conductive polymer. By using the gel polymer electrolyte as the electrolyte, the fluidity of the electrolyte is lost and the ion conduction between the layers can be blocked easily, which is advantageous.

The ion conducive polymer used as the matrix polymer is, for example, polyethylene oxide (PEO), polypropylene oxide (PPO), a copolymer thereof, or the like. In such a polyalkylene oxide polymer, the electrolyte salt such as lithium salt can be dissolved easily.

The ratio of the liquid electrolyte (electrolyte solution) in the gel electrolyte is not limited to a particular ratio, and is desirably about several to 98 mass % from the viewpoint of the ion conductivity or the like. In the present embodiment, the gel electrolyte containing much electrolyte solution, in which the ratio of the electrolyte solution is 70 mass % or more, is particularly effective.

Note that in a case where the electrolyte layer is formed of the liquid electrolyte, the gel electrolyte, or the intrinsic polymer electrolyte, a separator may be used for the electrolyte layer. Specifically, the separator (including nonwoven fabric) may be, for example, a microporous film or microporous flat plate formed of polyolefin such as polyethylene or polypropylene, or a nonwoven fabric.

The intrinsic polymer electrolyte has a structure in which the supporting salt (lithium salt) is dissolved in the matrix polymer, and does not include an organic solvent corresponding to a plasticizer. Therefore, in a case where the electrolyte layer is formed of the intrinsic polymer electrolyte, the liquid will not leak out from the battery and the reliability of the battery is improved.

The matrix polymer of the gel electrolyte or the intrinsic polymer electrolyte can exhibit the excellent mechanical strength by forming a cross-linking structure. To form the cross-linking structure, a polymerizable polymer for forming the polymer electrolyte (such as PEO or PPO) may be polymerized through thermal polymerization, UV polymerization, radiation polymerization, electron beam polymerization, or the like by using an appropriate polymerization initiator.

<Current Collecting Plate and Lead>

The current collecting plate may be used for the purpose of extracting current out of the battery. The current collecting plate is electrically connected to the current collector or the lead, and is led out of the laminate sheet corresponding to a battery package.

The material of the current collecting plate is not limited to a particular material, and may be a known high-conductive material that has conventionally been used as the current collecting plate for the lithium ion secondary battery. The material of the current collecting plate is, for example, a metal material such as aluminum, copper, titanium, nickel, stainless steel (SUS), or an alloy thereof, more preferably aluminum, copper, or the like from the viewpoint of lightness, corrosion resistance, and high conductivity. Note that the positive electrode current collecting plate and the negative electrode current collecting plate may be formed of either the same material or different materials.

A positive electrode terminal lead and a negative electrode terminal lead are used if necessary. As the material of the positive electrode terminal lead and the negative electrode terminal lead, a terminal lead used for a public lithium ion secondary battery may be used. Note that a part extracted from the battery package 29 is preferably coated with a thermal shrinkable tube or the like with heat insulation property, so that the product (for example, automobile component, especially electronic component) is prevented from being affected by electric leakage occurred by contact between this part and a peripheral device, a wire, or the like.

<Battery Package>

The battery package 29 may be a known metal can case, or a bag-shaped case formed of a laminate film including aluminum that can cover the power generating element. The laminate film may be, for example, a three-layer laminate film formed by stacking PP, aluminum, and nylon in this order; however, the battery package 29 is not limited to this laminate film. The battery package 29 is preferably a laminate film because of having higher output and excellent cooling performance and being suitably usable for a battery of large devices such as EV and HEV.

The lithium ion secondary battery can be manufactured by a conventionally known manufacturing method.

<External Appearance Structure of Lithium Ion Secondary Battery>

Figure 2:
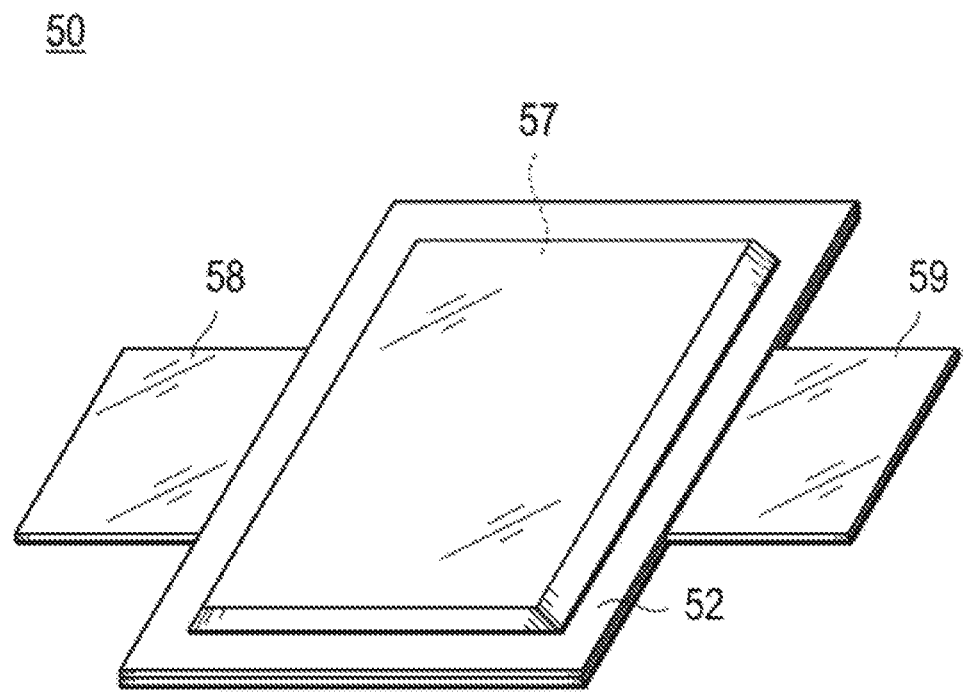
FIG. 2 is a perspective view schematically illustrating an external appearance of a stacked flat lithium ion secondary battery corresponding to a typical embodiment of an electrical device according to the present invention.

FIG. 2 is a perspective view illustrating an external appearance of a stacked flat lithium ion secondary battery.

As illustrated in FIG. 2, a stacked flat lithium ion secondary battery 50 has a flat rectangular shape, and from both ends, a positive electrode current collecting plate 59 and a negative electrode current collecting plate 58 for extracting power are led out. A power generating element 57 is covered with a battery package 52 of the lithium ion secondary battery 50, and its periphery is heat sealed. The power generating element 57 is tightly sealed in a state that the positive electrode current collecting plate 59 and the negative electrode current collecting plate 58 are led to the outside. Here, the power generating element 57 corresponds to the power generating element 21 of the lithium ion secondary battery (stacked battery) 10 illustrated in FIG. 1. The power generating element 57 is formed by stacking a plurality of unit cell layers (unit cells) 19. Each unit cell 19 includes the positive electrode (positive electrode active material layer) 13, the electrolyte layer 17, and the negative electrode (negative electrode active material layer) 15.

The lithium ion secondary battery is not limited to a stacked flat shape (laminate cell). A wound type lithium ion battery that has a cylindrical shape (coin cell), a prismatic shape (prismatic cell), a flat rectangular shape deformed from a cylindrical shape, a cylindrical cell, or the like may be used without a particular limitation. The cylindrical shape or the prismatic shape may use the laminate film as its packaging material, and a conventional cylindrical can (metal can) may also be used without a particular limitation. Preferably, the power generating element is packaged with the aluminum laminate film. The weight can be reduced in this mode.

In addition, there is no particular limitation regarding the extraction of the positive electrode current collecting plate 59 and the negative electrode current collecting plate 58 illustrated in FIG. 2. The positive electrode current collecting plate 59 and the negative electrode current collecting plate 58 may be extracted from the same side or the positive electrode current collecting plate 59 and the negative electrode current collecting plate 58 may be separated into a plurality of pieces and extracted from each side, without limitation to the one illustrated in FIG. 2. In the wound type lithium ion battery, the cylindrical can (metal can) may be used instead of the current collecting plate to form the terminal.

As described above, the negative electrode and the lithium ion secondary battery formed of the negative electrode active material for the lithium ion secondary battery according to the present embodiment can be suitably used as a power source with high capacity, such as an electric vehicle, a hybrid electric vehicle, a fuel cell vehicle, or a hybrid fuel cell vehicle. That is to say, the negative electrode and the lithium ion secondary battery including the negative electrode active material for the lithium ion secondary battery according to the present embodiment can be used suitably for the power source for driving the vehicle or the auxiliary power source that requires the high volume energy density and high volume output density.

Note that in the above embodiment, the lithium ion battery is used as the example of the electrical device; however, the electrical device is not limited to the lithium ion battery and may be another type of secondary battery or a primary battery. In addition, the present invention is also applicable to not just the battery but also the capacitor.

EXAMPLES

The present invention is described in more detail with reference to Examples below. However, the technical range of the present invention is not limited to Examples below only. Note that in the present application, the composition ratio of metal is expressed in mass %.

Example 1

[Manufacture of Silicon-Containing Alloy]

By the mechanical ironing method below, the silicon-containing alloy with a composition of $Si_{62}Sn_8Ti_{30}$ (composition ratio corresponds to mass ratio) was manufactured.

Specifically, 1620 g of zirconia crushing balls ($\phi$ 5 mm) and 1 g of carbon (SGL) were input to a crushing pot made of SUS using the mixing ball mill device C-01M manufactured by ZOZ in Germany. After that, a pre-crushing process was performed for 10 minutes at 1000 rpm. Then, powder of the raw materials of each alloy was put therein by 100 g in total, and the mixture was alloyed (alloying process) for 20 hours at 1500 rpm. Subsequently, a micro-crushing process was performed for an hour at 400 rpm and thus, the silicon-containing alloy (negative electrode active material) was obtained. Note that in the mixing ball mill device used in the present example, revolution radius rs=0.070 [m], rotation radius rp1=0 [m], and the number of rotations rpm=1500 [rotations/min]; therefore, the centrifugal force was calculated as Gn1=176.0 [G].

[Manufacture of Negative Electrode]

Using a defoaming and kneading machine (Thinky AR-100), 80 parts by mass of the silicon-containing alloy ($Si_{62}Sn_8Ti_{30}$) manufactured as above that corresponds to the negative electrode active material, 5 parts by mass of acetylene black corresponding to the conductive agent, and 15 parts by mass of polyimide corresponding to the binder were mixed and dispersed in N-methylpyrrolidone; thus, negative electrode slurry was obtained. Next, the obtained negative electrode slurry was uniformly applied on both surfaces of the negative electrode current collector that is formed of a copper foil so that the negative electrode active material layer had a thickness of 30 μm. The slurry was dried for 24 hours in vacuum and thus, the negative electrode was obtained.

[Manufacture of Lithium Ion Secondary Battery (Coin Cell)]

The manufactured negative electrode and an opposite electrode Li foil (diameter of 15 mm and thickness of 200 μm, manufactured by Honjo Metal Co., Ltd.) were disposed to face each other, and a separator (Celgard 2400, manufactured by Celgard) was disposed therebetween. Next, the stack of the negative electrode, the separator, and the opposite electrode Li was disposed on a bottom side of a coin cell (CR2032, material: stainless steel (SUS316)). Further, in order to maintain the insulation between the positive electrode and the negative electrode, a gasket is attached. The electrolyte solution to be described below is injected with a syringe, a spring and a spacer are stacked, an upper part of the coin cell is overlapped thereon and clamped for sealing; thus, the lithium ion secondary battery (coin cell) was obtained.

The electrolyte solution was formed by dissolving lithium hexafluorophosphate ($LiPF_6$) as the lithium salt into an organic solvent at a concentration of 1 mol/L. The organic solvent was obtained by mixing ethylene carbonate (EC) and diethyl carbonate (DEC) at a ratio of EC:DEC=1:1 (volume ratio).

Example 2

The negative electrode active material, the negative electrode, and the lithium ion secondary battery (coin cell) were manufactured by a procedure similar to that of Example 1 described above except that the composition of the silicon-containing alloy was changed to $Si_{64}Sn_6Ti_{30}$.

Example 3

By the following liquid rapid solidification, the silicon-containing alloy with a composition of $Si_{62}Sn_8Ti_{30}$ (composition ratio is mass ratio) was manufactured.

Specifically, an ingot of the silicon-containing alloy $Si_{62}Sn_8Ti_{30}$ was manufactured by an arc melting method using high-purity metal Si ingot (5 N), high-purity Ti wire (3 N), and high-purity Sn plate (3 N).

Subsequently, using the obtained ingot as the master alloy, the silicon-containing alloy was manufactured by the liquid rapid solidification. Specifically, using the liquid rapid solidification device NEV-A05 manufactured by NISSIN GIKEN Corporation, the ingot (master alloy) of $Si_{62}Sn_8Ti_{30}$ was put into a quartz nozzle installed in a chamber whose atmosphere was replaced with Ar and gauge pressure was reduced to −0.03 MPa, and the ingot was melted by high-frequency induction heating. After that, the obtained liquid was jetted onto a Cu roll with a rotation number set to 4000 rpm (peripheral speed: 41.9 msec) with a jetting pressure of 0.05 MPa; thus, a thin band shaped alloy (rapidly solidified thin band) was manufactured.

After that, the obtained thin band shaped alloy (rapidly solidified thin band) was crushed into pieces with a diameter of approximately 15 μm, and the obtained crushed pieces were subjected to the mechanical ironing process. Specifically, using the planetary ball mill device P-6 manufactured by Fritsch in Germany, zirconia crushing balls and the above crushed substance were input to the zirconia crushing pot, and the mixture was subjected to the mechanical ironing process under a condition of 48 hours at 600 rpm, so that the alloy was formed. After that, the crushing process was performed for one hour at 400 rpm, so that the silicon-containing alloy (negative electrode active material) was obtained. In the planetary ball mill device used in the present example, revolution radius rs=0.060 [m], rotation radius rp1=0.033 [m], rotation-revolution ratio iw=−1.818 [-], and the number of rotations rpm=600 [rotations/min]; therefore, the centrifugal force was calculated as Gn1=19.4 [G].

The negative electrode and the lithium ion secondary battery (coin cell) were manufactured in a manner similar to Example 1 except that the silicon-containing alloy obtained as above was used.

Comparative Example 1

The negative electrode active material, the negative electrode, and the lithium ion secondary battery (coin cell) were manufactured in a manner similar to Example 1 except that the composition of the silicon-containing alloy was changed to $Si_{60}Sn_{20}Ti_{20}$ and the alloying process was performed for 48 hours.

[Measurement of Bond Peak Intensity of Negative Electrode Active Material]

The negative electrode for coin cell manufactured in Examples 1 to 3 and Comparative Example 1 was analyzed by XAFS measurement. The device and the condition used in the XAFS measurement are as below.

(XAFS Measurement Condition)
1) Experiment facility: SR Center, Ritsumeikan University
2) Experiment station: BL-10
3) Dispersive crystal: InSb (111)
4) Measurement method: simultaneously measure in two modes of total electron yield (sample current) and partial fluorescence yield (silicon drift detector)
5) Measurement range: 1770 to 2500 eV (Si—K absorption end)

The radial wave function is obtained by performing Fourier transformation on the EXAFS vibration that is observed on the high energy side after the XANES spectrum region among the obtained XAFS spectra. FIG. 3 is a graph expressing the radial wave function spectra obtained by XAFS measurement in regard to the negative electrode for coin cell manufactured in Example 1. In the radial wave function spectra shown in FIG. 3, mainly, the Si—O correlation was observed as the first approximation peak (around 0.13 nm), and the Si—Si (Li) correlation was observed as the second approximation peak (around 0.2 nm). In addition, the third approximation peak (around 0.28 nm) that is considered to be the Si—Ti bond derived from the Si—Ti alloy was also observed. Note that the peak intensity of the Si—O bond peak (S(1)), the peak intensity of the Si—Si bond peak (S(2)), the peak intensity of the Si—Ti bond peak (S(3)), and the peak intensity ratio of S(1) and S(3) to S(2) were measured (calculated). The results are shown in Table 1 below.

[Evaluation on Charging-Discharging Efficiency and Cycle Durability]

The charging-discharging efficiency and the cycle durability of the lithium ion secondary batteries (coin cells) manufactured in Examples 1 to 3 and Comparative Example 1 were evaluated in accordance with the charging and discharging test conditions.

(Charging and Discharging Test Condition)
1) Charging and discharging test machine: HJ0501SM8A (HOKUTO DENKO CORPORATION)
2) Charging and discharging condition
   [charging process] 0.1 mA, 10 mV→2 V (constant-current mode)
   [discharging process] 0.3 C, 2 V→10 mV (constant-current mode)
3) Thermostat chamber: PFU-3K (ESPEC CORP.)
4) Evaluation temperature: 300 K (27° C.)

Using the charging and discharging test machine, the coin cell for evaluation was charged at 0.1 mA from 10 mV to 2 V in a constant-current mode in a charging process (process of intercalating Li into electrode for evaluation) in a thermostat chamber that is set to the above evaluation temperature. After that, the discharging was performed at 0.3 C from 2 V to 10 mV in the constant-current mode in a discharging process (process of deintercalating Li from electrode for evaluation). This charging and discharging cycle is one cycle, and under the same charging and discharging condition, the charging and discharging test was performed from the initial cycle (first cycle) to 50th cycle. Then, the ratio (initial charging-discharging efficiency) of the initial discharging capacity to the initial charging capacity and the ratio of the discharging capacity in the 50th cycle to the discharging capacity in the first cycle (discharging capacity retention [%]) were obtained and shown in Table 1 below.

TABLE 1

| | Silicon-containing alloy composition | Manufacturing method | Alloying process time (hr) | Peak intensity S(1) Si—O | Peak intensity S(2) Si—Si | Peak intensity S(3) Si—Ti | Peak intensity ratio S(3)/S(2) | Peak intensity ratio S(1)/S(2) | Initial charging-discharging efficiency [%] | Discharging capacity retention [%] 50cyc |
|---|---|---|---|---|---|---|---|---|---|---|
| Example 1 | $Si_{62}Sn_8Ti_{30}$ | Mixing ball mill | 20 | 0.8 | 2.8 | 1.3 | 0.46 | 0.29 | 85.1 | 97.5 |
| Example 2 | $Si_{64}Sn_6Ti_{30}$ | Mixing ball mill | 20 | 0.9 | 3 | 1.5 | 0.50 | 0.30 | 89.8 | 99.3 |

TABLE 1-continued

|  | Silicon-containing alloy composition | Manufacturing method | Alloying process time (hr) | Peak intensity S(1) Si—O | Peak intensity S(2) Si—Si | Peak intensity S(3) Si—Ti | Peak intensity ratio S(3)/S(2) | Peak intensity ratio S(1)/S(2) | Initial charging-discharging efficiency [%] | Discharging capacity retention [%] 50cyc |
|---|---|---|---|---|---|---|---|---|---|---|
| Example 3 | $Si_{62}Sn_6Ti_{30}$ | Liquid rapid solidification + planetary ball mill | 48 | 0.9 | 2.3 | 0.9 | 0.39 | 0.39 | 81.5 | 96.8 |
| Comparative Example 1 | $Si_{60}Sn_{20}Ti_{20}$ | Mixing ball mill | 48 | 2.8 | 1.9 | 0.6 | 0.32 | 1.47 | 75.0 | 96.0 |

The results in Table 1 show that the peak intensity S(1) of the Si—O bond peak and the peak intensity S(2) of the Si—Si bond peak in the negative electrode active material according to the present invention satisfy the relation of S(2)>S(1). This indicates that in the electrical devices (lithium ion secondary batteries) according to Examples, the discharging capacity retention after 50 cycles is maintained high and the charging-discharging efficiency is excellent.

In addition, in Examples, the peak intensity of Si—O bond peak, the peak intensity S(2) of the Si—Si bond peak, and the peak intensity S(3) of the Si—Ti bond peak satisfy the relation of S(2)>S(3)≥S(1). However, in Examples 1 and 2 in which the relation of S(2)>S(3)>S(1) is satisfied, the charging-discharging efficiency and the discharging capacity retention are superior.

REFERENCE SIGNS LIST 10, 50 Lithium ion secondary battery (stacked battery)
11 Negative electrode current collector
12 Positive electrode current collector
13 Negative electrode active material layer
15 Positive electrode active material layer
17 Electrolyte layer
19 Unit cell layer
21, 57 Power generating element
25, 58 Negative electrode current collecting plate
27, 59 Positive electrode current collecting plate
29, 52 Battery package (laminate film)

The invention claimed is:

1. A negative electrode active material for an electrical device, comprising:
a silicon-containing alloy including a structure in which a phase mainly containing amorphous or low-crystalline silicon formed by dissolving tin in a crystal structure of silicon is dispersed in a parent phase of a silicide phase including $TiSi_2$, and having a composition expressed by:

$Si_xSn_yTi_zA_a$ wherein A represents an inevitable impurity, x, y, z, and a represent values in mass %, and 0<x<100, 0<y<100, 0<z<100, and 0≤a<0.5, and x+y+z+a=100 are satisfied, and wherein, when a peak intensity of a Si—O bond peak that is observed at a position where an interatomic distance in a radial wave function observed by XAFS is 0.13 nm is S(1) and a peak intensity of a Si—Si bond peak that is observed at a position where the interatomic distance is 0.2 nm is S(2), a relation of S(2)>S(1) is satisfied.

2. The negative electrode active material for an electrical device according to claim 1, wherein a peak intensity ratio of S(1) to S(2) that is expressed by S(1)/S(2) is less than 0.5.

3. The negative electrode active material for an electrical device according to claim 1, wherein when a peak intensity of a Si—Ti bond peak that is observed at a position where the interatomic distance in the radial wave function observed by XAFS is 0.28 nm is S(3), a relation of S(2)>S(3)>S(1) is further satisfied.

4. The negative electrode active material for an electrical device according to claim 3, wherein a peak intensity ratio of S(3) to S(2) that is expressed by S(3)/S(2) is more than 0.31.

5. A negative electrode for an electrical device, comprising the negative electrode active material for an electrical device according to claim 1.

6. An electrical device comprising the negative electrode for an electrical device according to claim 5.

* * * * *